Figure 1:
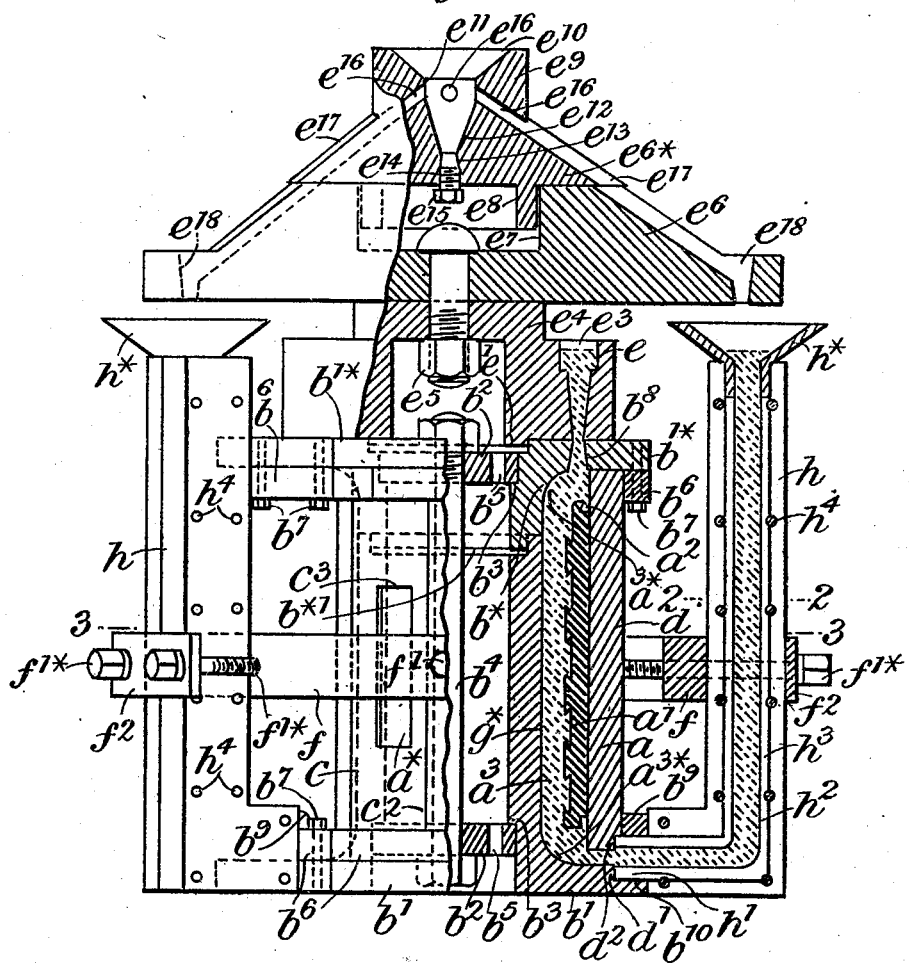

No. 795,830. PATENTED AUG. 1, 1905.
W. G. HANNA.
MOLD FOR BEARINGS.
APPLICATION FILED JAN. 30, 1905.

8 SHEETS—SHEET 1.

Witnesses:
C. H. White
J. A. Hudson

Inventor:
William George Hanna
By C. Melbourne White
Attorney

No. 795,830. PATENTED AUG. 1, 1905.
W. G. HANNA.
MOLD FOR BEARINGS.
APPLICATION FILED JAN. 30, 1905.

8 SHEETS—SHEET 2.

Witnesses:
C. H. White
J. A. Hudson.

Inventor:
William George Hanna
By  C. Melbourne White
Attorney

No. 795,830. PATENTED AUG. 1, 1905.
W. G. HANNA.
MOLD FOR BEARINGS.
APPLICATION FILED JAN. 30, 1905.

8 SHEETS—SHEET 3.

Witnesses:
C. H. White
J. A. Hudson

Inventor:
William George Hanna
By C. Melbourne White
Attorney

No. 795,830. PATENTED AUG. 1, 1905.
W. G. HANNA.
MOLD FOR BEARINGS.
APPLICATION FILED JAN. 30, 1905.

8 SHEETS—SHEET 4.

Witnesses:
C. H. White
J. A. Hudson

Inventor:
William George Hanna
By C. Melbourne White
Attorney

No. 795,830. PATENTED AUG. 1, 1905.
W. G. HANNA.
MOLD FOR BEARINGS.
APPLICATION FILED JAN. 30, 1905.
8 SHEETS—SHEET 5.
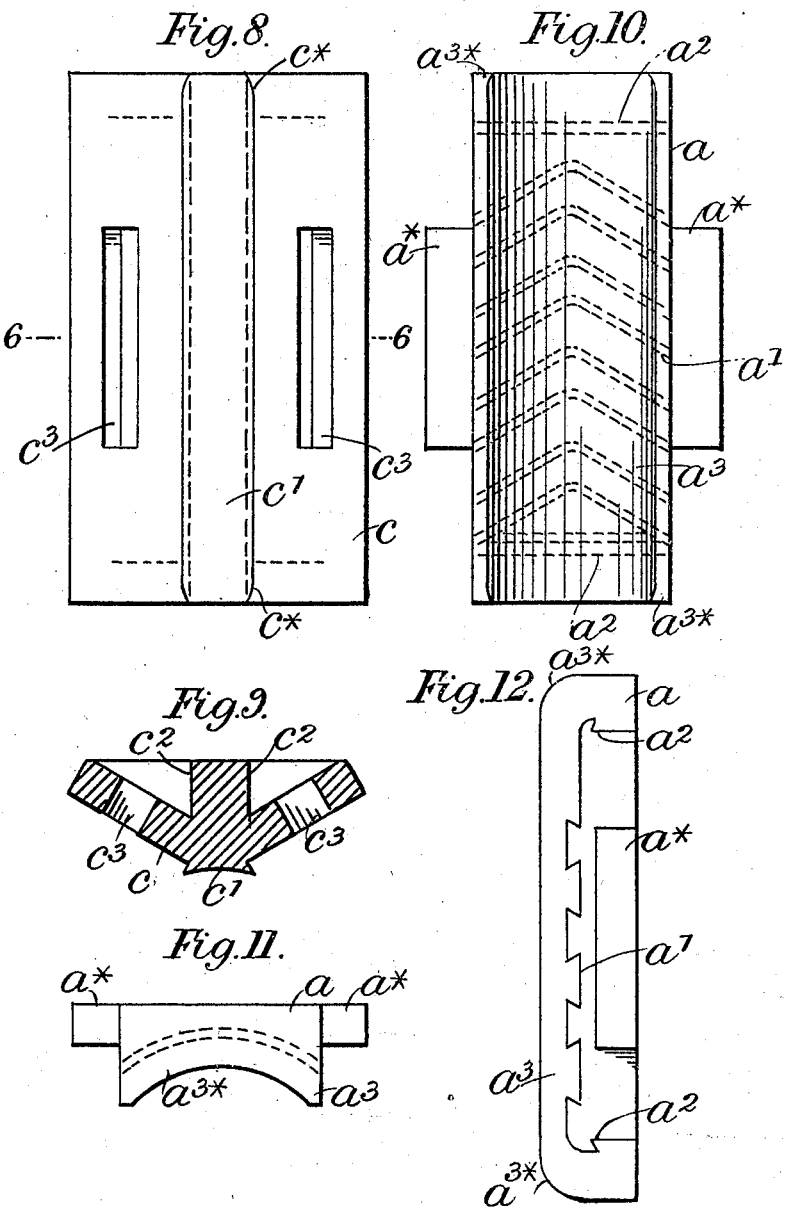

No. 795,830. PATENTED AUG. 1, 1905.
W. G. HANNA.
MOLD FOR BEARINGS.
APPLICATION FILED JAN. 30, 1905.
8 SHEETS—SHEET 6.

Witnesses:
C. H. White
J. A. Hudson.

Inventor:
William George Hanna
By C. Melbourne White
Attorney

No. 795,830. PATENTED AUG. 1, 1905.
W. G. HANNA.
MOLD FOR BEARINGS.
APPLICATION FILED JAN. 30, 1905.

8 SHEETS—SHEET 7.

Witnesses:
C. H. White
J. A. Hudson.

Inventor:
William George Hanna
By C. Melbourne White
Attorney

No. 795,830. PATENTED AUG. 1, 1905.
W. G. HANNA.
MOLD FOR BEARINGS.
APPLICATION FILED JAN. 30, 1905.
8 SHEETS—SHEET 8.
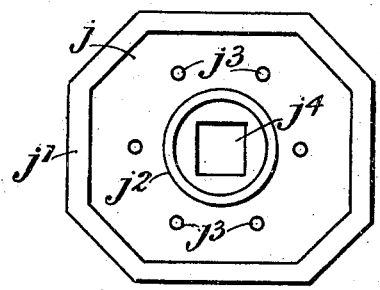
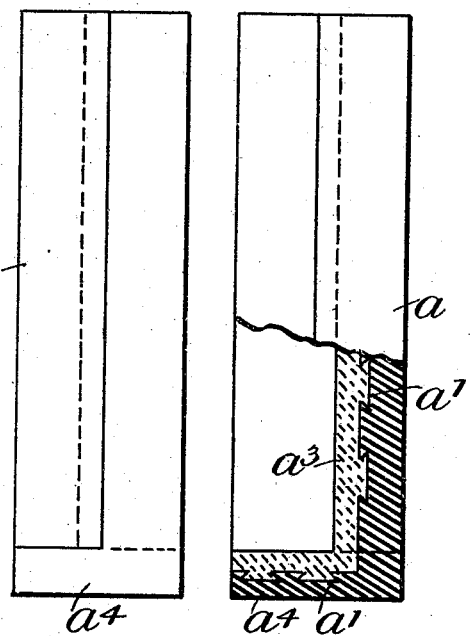
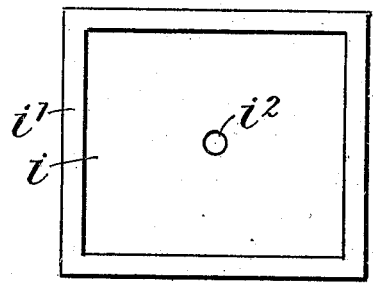
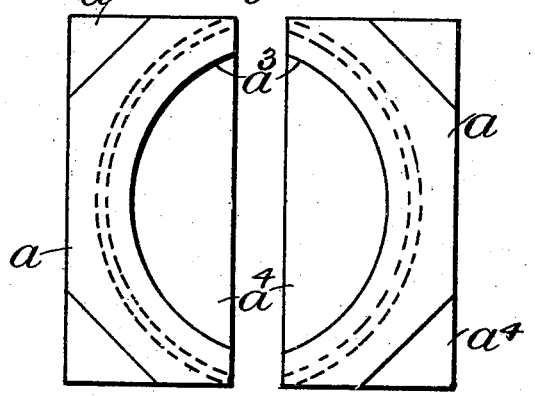
Witnesses:
C. H. White
J. A. Hudson.
Inventor:
William George Hanna
By C. Melbourne White
Attorney

UNITED STATES PATENT OFFICE.

WILLIAM GEORGE HANNA, OF GLASGOW, SCOTLAND.

MOLD FOR BEARINGS.

No. 795,830.           Specification of Letters Patent.           Patented Aug. 1, 1905.

Application filed January 30, 1905. Serial No. 243,389.

*To all whom it may concern:*

Be it known that I, WILLIAM GEORGE HANNA, engineer, a subject of the King of Great Britain, residing at 15 Charing Cross, Glasgow, in the county of Lanark, Scotland, have invented certain new and useful Improvements in or Connected with Molds for Bearings, of which the following is a specification, reference being had to the drawings hereunto annexed and to the figures marked thereon.

The invention relates to improvements in or connected with means for the manufacture of brasses or bushes for the bearings of shafts, axles, or the like, more especially applicable to railway and tramway rolling-stock, locomotive-engines, and motors.

The usual method of producing brasses or bushes for bearings consists in first casting them to approximately the size and shape required and then boring or turning the faces thereof to fit the diameter of the shaft, axle, or the like in connection with which they are to be employed, and this method is adopted whether or not the brasses or bushes are wholly or partly faced or lined with Babbit or other antifriction metal. Cutting into the surface of the cast antifriction or other metal in this manner besides adding to the cost of manufacture destroys the skin thereof, opens the pores of the metal, and increases its frictional resistance to the revolving axle, shaft, or the like.

According to a former invention of W. H. Tomson and myself, the subject-matter of Letters Patent No. 731,632, of 1903, the necessity for boring or turning was dispensed with, and the brasses or bushes, whether the bearing-faces were partially or entirely coated or lined with antifriction metal or not, were cast to exactly fit the diameter of and ready for immediate application to the shaft, axle, or the like, and the bearing or box in connection with which they were to be used and in such manner that they presented a perfectly unbroken and smooth skin or bearing-surface, so that the frictional resistance of said bearing-surfaces was lessened and the texture of the metal at the same time condensed or consolidated, while the durability, and consequently the commercial value, of the brasses or bushes was much improved. The method employed by us for the manufacture of the brasses or bushes consisted in casting several of said bushes in separate compartments of a mold and around a core or cylindrical center of the precise diameter and form of the axles or the like to which they were to be applied. The metal was run or poured into the upper parts of the compartments of the mold, and the pouring was effected, preferably, by means of a device termed a "pouring-block." Pouring the metal into the compartments of the mold at the top, whether directly by a ladle or the like or by the aid of a pouring-block, such as that next hereinafter described, was found to be bad in principle, inasmuch as it frequently produced defective castings, possessing faults such as "draws," blowholes, honeycombing, and the like, necessitating remelting and recasting at considerable trouble and expense, and even then the faults not infrequently reappeared. The pouring-block employed by us consisted of a base adapted to rest upon the flange of the cylindrical center or core, and upon the upper side of the base was formed a hollow projection or well into which the fluid metal was poured, and the bottom of the well rose in the form of a cone, and in the face of the cone were formed gates, gutters, or channels, which extended beneath the wall of the well into the base, where they communicated with vertical holes or ways, which registered with pouring-holes in the flange of the cylindrical center or core, and the office of the conical bottom to the well was to distribute the metal equally to the gutters or channels, and thus to the mold. Now it was found in practice that the conical bottom of the well did not insure an equal or regular distribution of the metal to the several compartments of the mold; but said distribution was somewhat irregular. There was no certainty that the quantity of metal flowing into each of the channels would be equal; but it frequently happened that a larger quantity passed into some or one of the channels than into the other or others, thus completely filling the corresponding compartment or compartments of the mold, leaving the other or others only partially filled when the charge of metal poured from the ladle had been exhausted, and this irregularity proved a distinct disadvantage in the practical working of the apparatus.

Now the primary objects of the present invention are to obviate the difficulties above pointed out. For this purpose, according to the principal features of the present invention, instead of pouring the metal into the top of each compartment of the mold or casting apparatus, as heretofore, means are provided whereby it is introduced at the bottom thereof, by which arrangement the production of defective castings is obviated or the percentage thereof is largely reduced, and instead of the rising conical bottom in the well of the pouring-block a conical depression is employed, whereby an even distribution of the metal to the gutters or channels, and consequently to the several compartments of the mold, is insured, while the invention also consists in various details of construction of the apparatus, as hereinafter described.

In order that the said invention may be clearly understood and readily carried into effect, I will proceed, aided by the accompanying drawings, fully to describe the same.

Figures 2, 3:
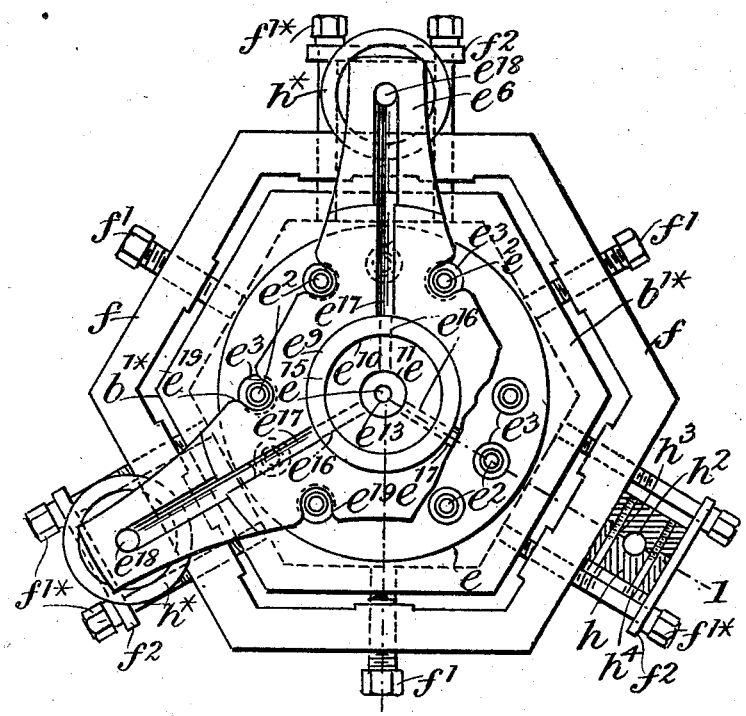
Figure 4:
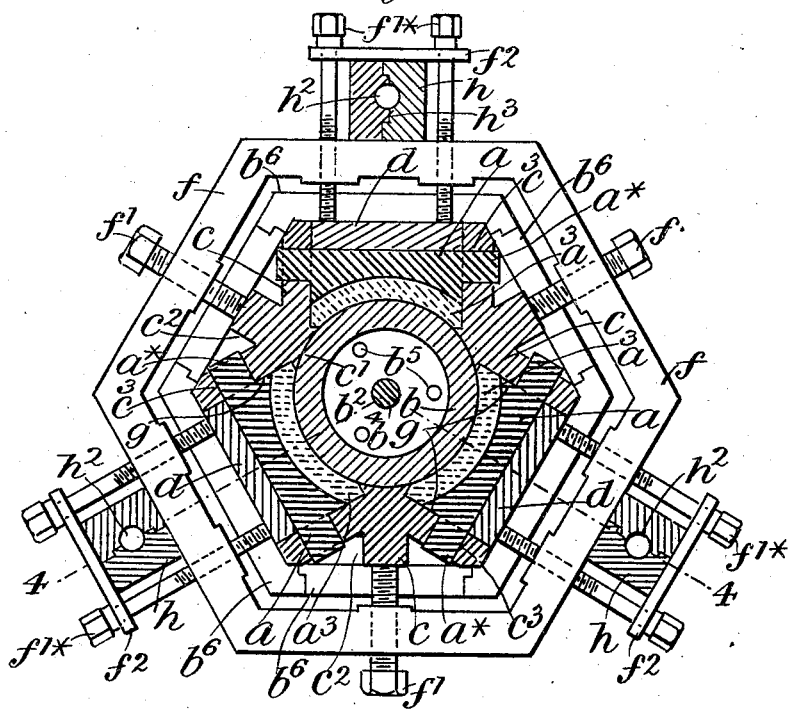
Figure 7:
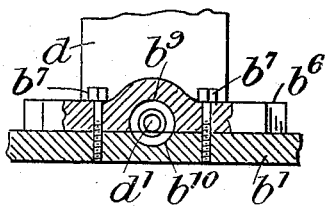
Figure 5:
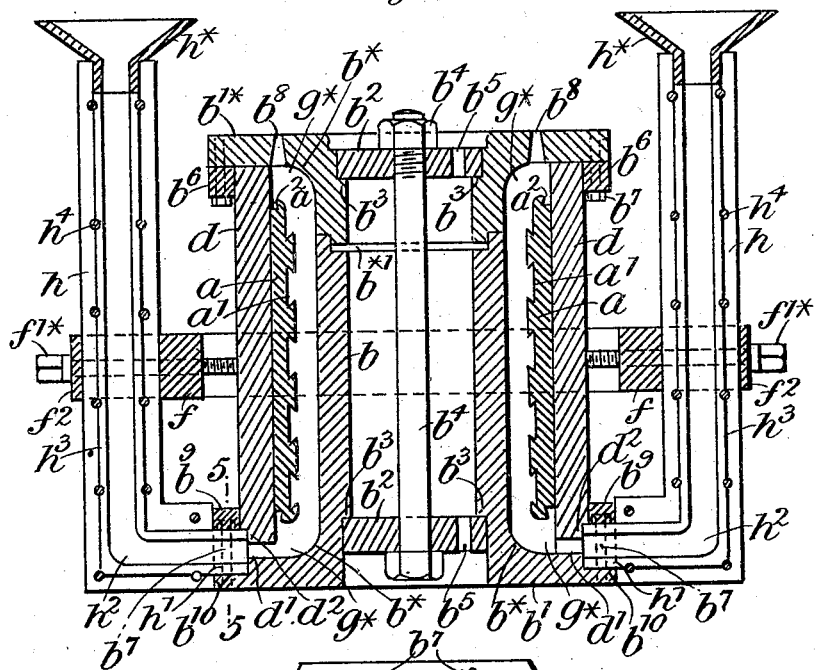
Figure 6:
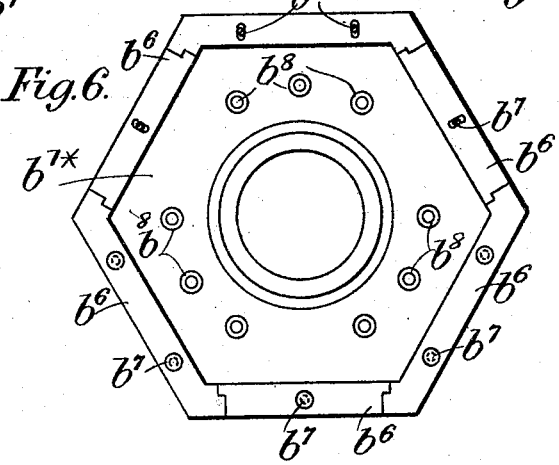
Figure 13:
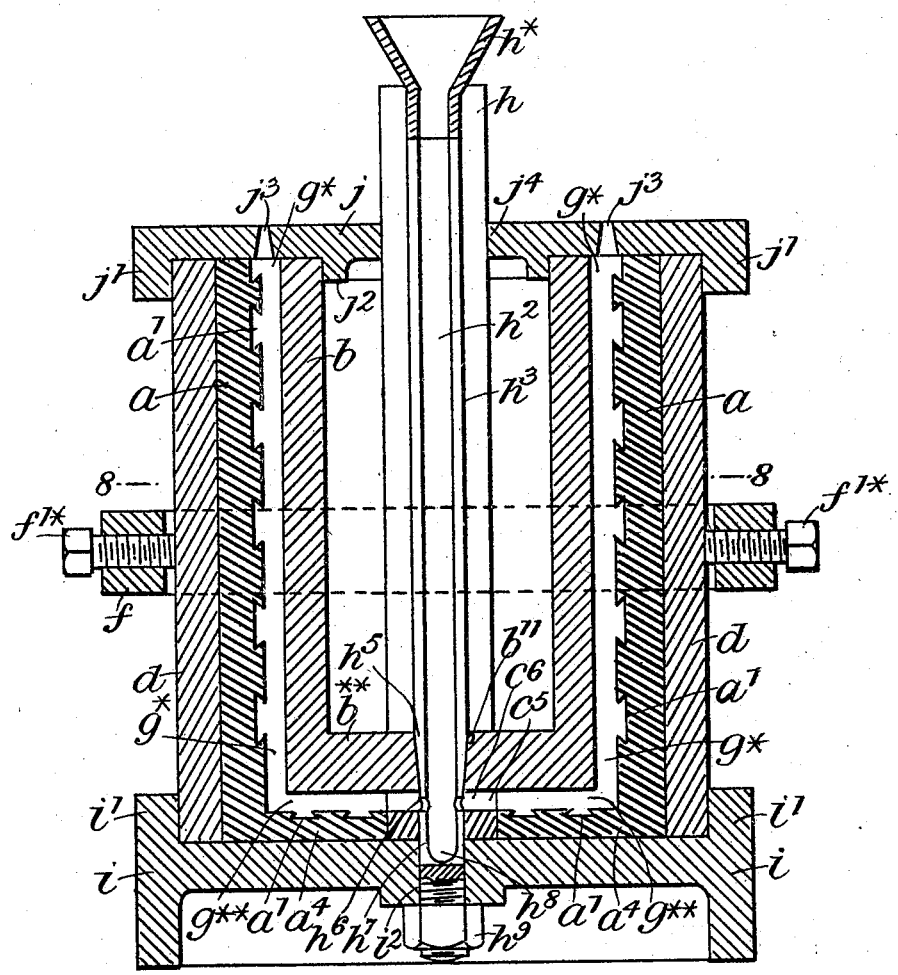
Figure 14:
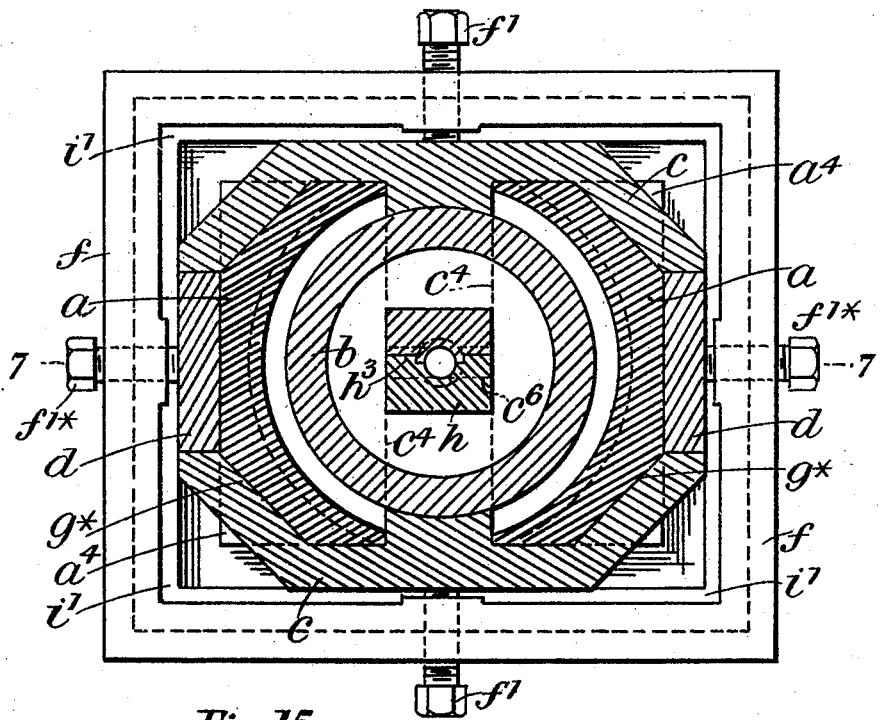
Figure 15:
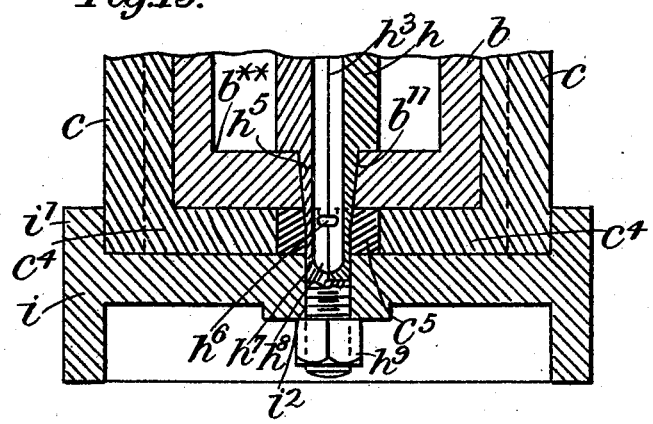

In the drawings, Figure 1 is a sectional elevation, the section being taken on the line 1 1 of Fig. 2 of a complete casting apparatus constructed according to the present invention and showing the castings in position. Fig. 2 is a sectional plan thereof. Fig. 3 is a horizontal section of part taken on the line 2 2 of Fig. 1. Fig. 4 is a horizontal section taken on the line 3 3 of Fig. 1. Fig. 5 is a vertical section taken on the line 4 4 of Fig. 4, showing the apparatus built up in readiness for casting with the bodies or bases of the bushes in position, but prior to the placing of the pouring-block thereon. Fig. 6 is an underside view of the top part of the mold, showing more particularly the packing-strips. Fig. 7 is a vertical section taken on the line 5 5 of Fig. 5. Fig. 8 is an inside face view of one of the filling or distance pieces. Fig. 9 is a horizontal section taken on the line 6 6 of Fig. 8. Fig. 10 is a face view of one kind of brass or bush for a bearing that the apparatus is adapted to produce. Fig. 11 is an end view thereof. Fig. 12 is a side view thereof. Fig. 13 is a vertical section, taken on the line 7 7 of Fig. 14, of a modified form of apparatus. Fig. 14 is a horizontal section taken on the line 8 8 of Fig. 13. Fig. 15 is a similar section to Fig. 13, but taken at right angles thereto, of the lower part of the mold. Fig. 16 is an under side view of the top of the mold. Fig. 17 is a plan of the bottom of the mold. Fig. 18 is a sectional side elevation of a pair of bushes as delivered from the mold, and Fig. 19 is a plan thereof.

In the several figures like parts are indicated by similar letters of reference, and said figures are drawn to a variable scale.

Referring to Figs. 1 to 12, $a$ represents the body or base of a brass bush or lining for a bearing such as the present apparatus is adapted to deal with, and the face of this base is formed with approximately transverse undercut grooves $a'$ of a flattened V-section, or they might be of other suitable shape, and the ends thereof are provided with undercut grooves $a^2$, and in this particular pattern the base $a$ is formed with lateral lugs or flanges $a^*$ for the purpose hereinafter described, although it will be understood that the shape or pattern of the base may be varied according to circumstances, in which case the shape of the casting apparatus hereinafter described would be varied correspondingly. The face and ends of the base $a$ are grooved in the above manner and covered with a facing or lining $a^3$, of antifriction metal, in accordance with the specification of Letters Patent granted to W. H. Tomson and myself, dated the 23d day of June, 1903, No. 731,632, and the principal purpose of said patent was to apply this facing or lining or to cast bushes or brasses complete without said facing or lining. By means of the present invention these operations are accomplished in a more effective manner than heretofore.

In carrying the invention into effect the apparatus may be constructed to cast or apply the antifriction coating or lining to any suitable number of brasses or bushes; but it is preferably constructed to accommodate three bodies or bases $a$, and that arrangement will now be described.

$b$ represents the center of the apparatus, which consists of a hollow cylinder of iron or other suitable material at its ends formed with the flanges $b'\ b'^*$, upon which latter is adapted to be seated a pouring device or block $e$, hereinafter described, and the ends of the cylinder $b$ at its point of connection $b^*$ with the flanges $b'\ b'^*$ are outwardly curved to give the required radius or rounding at $a^{3*}$ to the antifriction metal facing or lining $a^3$ of the brass or bush; but it will be understood that this shape will necessarily be varied with the shape of the axle-journal or the like to the bearing of which the brass or bush is to be applied.

The cylindrical center or core $b$, which should have a highly-polished surface, is formed of a diameter equal to that of the shaft, axle, or the like, with which the finished brass bush or lining is intended to be used and is designed to form and give an extremely smooth skin to the face of the lining or bearing-surface $a^3$, while the flanges $b'\ b'^*$ are arranged at a distance apart equal to the length of the finished bush with its coating or lining $a^3$ of antifriction metal and are designed to form the ends thereof.

Arranged around the cylinder or core $b$ at equal distances apart are three filling or distance pieces $c$, each having an approximately triangular transverse section, hollows $c^2$ being formed in the backs thereof for the sake of lightness, and these distance-pieces $c$ are arranged with their apices $c'$ toward, and said apices are shaped to closely fit the surface or periphery of the cylindrical center or core $b$.

The distance-pieces $c$ are at their ends shaped to fit between the flanges $b'\ b'^*$ of the cylindrical center $b$ and are at their ends rounded at $c^*$ to fit the radius or rounding $b^*$ thereof, while they are formed with holes or slots $c^3$ therethrough to receive the lugs or flanges $a^*$ of the bases or bodies $a$, as hereinafter described.

The filling-pieces $c$ are so shaped that when in position around the cylindrical center $b$ opposite sides or angles of adjacent filling-pieces are approximately parallel, thus forming or leaving recesses or spaces $g$ between them, as will be seen on reference to Fig. 4, or, if desired, said recesses might be tapered. Into each of these spaces $g$ between the filling or distance pieces $c$ is placed a base or body $a$, formed with dovetail or key grooves $a'$ $a^2$, as hereinbefore described, and such body or base $a$ is of a width to fit into a recess or space $g$ between the filling or distance pieces $c$. Each body or base $a$ in this example is of a length considerably less than the distance between the flanges $b'$ $b'^*$ of the cylindrical center $b$, and it is held in a central position with relation to the length of the recess $g$ and also at the required distance from the surface or periphery of the cylindrical center or core $b$ by the lugs or flanges $a^*$ upon the base or body $a$, which fit into the slots $c^3$ in the adjacent distance-pieces $c$ or by suitably arranging the lugs or flanges $a^*$ of the base $a$ and the slots $c^3$ of the distance-pieces $c$, the body or base $a$ might be held in any other suitable position, according to the form required to be given to the lining or facing $a^3$. A space $g^*$ is thus left, as shown more particularly at Fig. 5, between the face of the body or vase $a$ of the brass or bush and the surface or periphery of the cylindrical center or core $b$ and between the ends of the body or base $a$ and the flanges $b'$ $b'^*$ of the cylindrical center or core $b$ to receive the antifriction metal necessary to form the lining or covering $a^3$ of said body.

A covering or backing plate $d$ is placed over each body $a$, and said backing-plate is shaped to fit the recess or space $g$ between the distance-pieces $c$ and at its ends fits against and between the opposite faces of the flanges $b'$ $b'^*$ of the cylinder $b$; but in some cases the backing or covering plates $d$ may be dispensed with.

The filling or distance pieces $c$ and covering or backing plates $d$ are fastened in position and held or forced together by means of a clamping hoop or ring $f$, in the present example shown to be hexagonal, although it might be of other suitable shape, which surrounds the entire device and is furnished with set or adjusting screws $f'$ $f'^*$, which bear upon the filling or distance pieces $c$ and backing-plates $d$, respectively.

In order to facilitate the assembling of the parts, the cylindrical center or core $b$ at a point below the flange $b'^*$ is horizontally divided upon the line $b^{*\prime}$ into two parts, which are fastened together with capability of easy separation by means of axially-perforated disks $b^2$, seating on shoulders $b^3$, and a bolt $b^4$, passing through said perforations, the disks being provided with air-holes $b^5$, or said parts might be otherwise fastened together, so as to be easily separable.

After the assembling of the parts the joints between the ends of the filling or distance pieces $c$ and backing or covering plates $d$ are, if necessary, made good by means of packing-strips $b^6$, which are arranged in the form of a hexagon and at their meeting ends notched or rabbeted, while they are removably and adjustably fixed to the upper and under sides of the flanges $b'$ and $b'^*$, respectively, by means of screws $b^7$. In the upper flange $b'^*$ of the cylindrical center or core $b$ approximately opposite each of the spaces $g^*$ between the body or base $a$ of the bush and the surface or periphery of the cylindrical center or core $b$ are formed several vent-holes $b^8$, which are upwardly tapered to facilitate the knocking out of any metal that may lodge therein in the operation of casting the antifriction metal $a^3$ upon the body or bush $a$.

At the lower part of each backing-plate $d$ is formed a pouring-hole $d'$, and in the back of said plate and concentric with said hole is formed a semicircular recess $d^2$, while the adjacent packing-strip $b^6$ is at $b^9$ arched to correspond, and in the adjacent flange $b'$ of the cylindrical center or core $b$ is formed a corresponding recess $b^{10}$, as shown more particularly at Fig. 7.

In connection with the pouring-hole $d'$ is employed a pouring-tube $h$, which at its lower end is cranked and formed with a nozzle or spigot $h'$, which fits into the recess $d^2$ in such manner that its bore $h^2$ registers with the pouring-hole $d'$, and at its upper end it is furnished with a removable funnel or filler $h^*$, into which the metal may be poured directly from a ladle or by means of the pouring-block hereinafter described.

The pouring-tube $h$ is longitudinally formed in two parts, united at the meeting faces by a rabbeted joint $h^3$, and the two parts are fastened together by screw-bolts $h^4$, arranged at suitable intervals, or the parts might be otherwise fastened together, while the tube as a whole is supported in the required position by means of the ring $f$ and a clamping-bar $f^2$, perforated and mounted upon the set-screws $f'^*$, which are arranged one on each side of the pouring-tube, and the pouring-tube $h$ is thereby firmly clamped between the bar $f^2$ and the ring $f$.

By mounting and constructing the pouring-tube $h$ in the manner hereinbefore described it may be easily placed in position after assembling the other parts in readiness for casting and dismounted after the casting operation, when the two parts of said tube may be readily separated and any metal which has cooled in the bore $h^2$ may be removed therefrom without the necessity for melting out the same.

Although the pouring-tube $h$ is in the drawings shown to be formed of a square cross-section it will be understood that it may be of any other suitable shape.

The meeting faces of the several parts, such as the cylindrical center or core $b$, the filling or distance pieces $c$, the backing or covering plates $d$, and the parts of the pouring-tube $h$ are faced by turning, planing, or otherwise and shaped so as to fit together as nearly as possible in a fluid-tight manner.

The apparatus built up in the manner hereinbefore described and as shown at Fig. 5, with the several bases or bodies $a$ in position therein, is ready for the casting operation, previous to which, however, it is by means of a furnace or otherwise heated to a suitable temperature—about 500° Fahrenheit, for example—prior to the pouring of the fluid antifriction metal thereinto. The molten metal may be poured into the fillers or funnels $h^*$ of the several pouring-tubes $h$ by any suitable means; but the pouring is preferably effected by the aid of the device hereinafter described and which is termed a "pouring-block." As the molten metal is poured into each of the fillers or funnels $h^*$ it flows down the pouring-tube, through the pouring-hole $d'$, and into the space $g^*$ with some velocity, at any rate in the first instance carrying before it the whole of the air contained in said space and driving it out by the vent-holes $b^8$, thereby avoiding the risk of blow-holes or other imperfections in the facing or lining of the bush, and which were liable to occur when the metal was poured into the top of the space $g^*$ as heretofore.

The improved device or pouring-block, by the aid of which the antifriction metal is preferably fed into the fillers or funnels $h^*$ of the several pouring-tubes, is constructed in the following manner: The pouring-block is formed with a base $e$, which may be circular in shape, as shown, or of other suitable shape, and said base is adapted to rest upon the upper flange $b'^*$ of the cylindrical center or core $b$, and it is provided with a concentric cylindrical projection or spigot $e'$ of a diameter to easily fit the central hollow or bore of the cylindrical center or core $b$, and thus serve to centralize and prevent the lateral shifting of the pouring-block with relation to the casting apparatus. Formed through the base $e$ are a number of vertical holes or ways $e^2$, which at their lower ends are of a diameter equal to and register with the vent-holes $b^8$ in the upper flange $b'^*$ of the cylindrical center or core $b$, and at the upper part thereof each of said holes $e^2$ is formed with an enlargement $e^3$, into which any metal rising through the holes $e^2$ can overflow, while said hole is formed of a gradually-increasing diameter to facilitate the knocking out without the necessity for melting out of any metal which may solidify therein and in the enlargement $e^3$. The base $e$ is formed with a central hollow therein on the under side, and at the top said base is formed with a concentric cylindrical projection $e^4$, and upon this projection is seated and fastened, by means of a bolt and nut $e^5$, the upper and operative part $e^6$ of the pouring-block, and which for the purpose hereinafter described is horizontally divided into two parts $e^6$ $e^{6*}$. The part $e^6$ is formed with a concentric hollow or depression $e^7$ therein, and the part $e^{6*}$ is on its under side provided with a corresponding cylindrical but hollow projection $e^8$, adapted to easily fit the hollow $e^7$, by which means the two parts are firmly united against the possibility of accidentally shifting, but with capability of easy separation when required.

The upper parts $e^6$ $e^{6*}$ of the pouring-block are for the sake of lightness formed like a cross having three radial arms, the upper surfaces of which are inclined and the extremities of which extend over the fillers or funnels $h^*$ of the pouring-tubes $h$.

At the top of the pouring-block and centrally thereof is formed a hollow projection or well $e^9$ of comparatively small diameter, having a funnel-like mouth $e^{10}$, into which the fluid antifriction metal is poured from a ladle or otherwise, and below the mouth is a cylindrical part $e^{11}$, which terminates in a conical depression or bottom $e^{12}$, below and in continuation of which a hole $e^{13}$ extends into the hollow $e^7$. The upper part of the hole $e^{13}$ is formed conical and plain, and the lower part $e^{14}$ thereof is threaded and cylindrical, and into the threaded part is screwed a plug $e^{15}$, coned at its point, which seats in the corresponding part $e^{13}$ of the hole, and thus closes the bottom of the depression $e^{12}$, and the object of this construction is to enable any metal which may solidify in the mouth $e^{10}$ and depression $e^{12}$ to be punched out without the necessity for melting out, and which may be readily accomplished by lifting off the part $e^{6*}$ and unscrewing the plug $e^{15}$. Extending from about the level of the upper part of the depression $e^{12}$ through the wall of the well $e^9$ are three inclined gates or channels $e^{16}$, which open into corresponding but open gates, gutters, or channels $e^{17}$ of a larger diameter or width, which extend down the arms $e^6$ to the extremities thereof, where they communicate with vertical tapered holes or ways $e^{18}$, formed through said extremities and occupying positions axially in alinement with the fillers or funnels $h^*$ of the pouring-tubes $h$.

The part $e^{6*}$ of the pouring-block at its point of junction with the part $e^6$ is formed of slightly-larger diameter than the latter, and the upper part of each gutter is of slightly-smaller diameter than the lower part, so that the one part of the gutter $e^{17}$ will overhang or overlap the other, and thus any tendency for the fluid metal to run in between the parts $e^6$ $e^{6*}$ at the joint will be avoided.

Notches $e^{19}$ are formed in the pouring-block to enable the workman to view the enlargements $e^3$ at the upper ends of the holes $c^2$, and thus see by the rise of the metal therein when the space $g^*$ of the mold is full.

The pouring-block $e$ prior to the pouring of the antifriction metal is separately heated in a furnace to a very high temperature—about 600° to 700° Fahrenheit, for example—so as to maintain the metal passing therethrough in a thoroughly fluid condition, and it is then placed in position upon the casting apparatus, as shown at Figs. 1 and 2. The fluid metal is then poured into the well $e^9$ by means of a ladle or otherwise and rises in the depression $e^{12}$ until its general level reaches the inclined gates or channels $e^{16}$, through each of which it flows in equal volume instead of in variable quantity, as it was liable to do in the old arrangement herein first referred to. From the channels $e^{16}$ the metal flows by way of the open gutters $e^{17}$ to the extremities of the arms $e^6$, thence through the holes or ways $e^{18}$ into the fillers or funnels $h^*$ of the pouring-tube $h$ and through the latter into the space $g^*$ of the mold, as hereinbefore described.

It is desirable that the metal poured into the well $e^9$ of the pouring-block be in excess of that actually required to form the linings or facings of the brasses or bushes, and the surplus metal will overflow from the spaces $g^*$ by the vent-holes $b^8$ and holes or ways $e^2$ of the pouring-block into the enlargements $e^3$, where by reason of the notches $e^{19}$ it can readily be seen by the workman, who will thus know when to cease pouring, and this overflow will at the same time create a head of fluid metal which will materially assist to condense or consolidate the facings or linings of the bushes.

The metal within the ways $e^2$ and enlargements $e^3$ may by reason of the tapered formation of said ways be subsequently punched out, thereby avoiding the labor of melting out, and that within the pouring-tube $h$ and the depression $e^{12}$ of the pouring-block may also be removed, as hereinbefore explained.

By the employment of the pouring-block $e$ the fluid metal is run into the several compartments $g^*$ of the apparatus simultaneously and in equal volume and cast under equal conditions therein, thereby insuring equality of the castings, and by reason of the highly-heated condition of the pouring-block the head of metal obtained, as above explained, and by the use of the pouring-tube $h$ and the introduction of the metal into the compartments of the mold at the bottom thereof the metal is forced into the spaces $g^*$ of the apparatus in an extremely fluid condition and with considerable velocity and pressure, with the result that the antifriction-metal face cast upon the bases or bodies $a$ is thereby condensed or solidified and formed of a very close and even texture throughout and without blow-holes or other blemishes and with its skin or bearing-surface in perfect condition for immediate use, while at the same time it is caused to more perfectly run into the grooves $a'$ and more closely attach itself to the body $a$ than heretofore.

It will be understood that when it is required to form brasses or bushes entirely of gun-metal or the like—that is to say, without a facing or lining of antifriction metal—the bases or bodies $a$ are not required in the casting apparatus, but fluid gun-metal or the like is run into the compartments of the apparatus, which would be arranged in any suitable manner, instead of antifriction metal.

In the example given at Figs. 13 to 19 is illustrated a modified form of casting apparatus designed to line or face two bushes or bases having one end flange, or it might be employed to cast the bushes complete in gun-metal or the like without a lining. In this case the flanges $b'$ $b'^*$ of the cylindrical center or core $b$ are dispensed with and said cylindrical center is formed with a bottom $b^{**}$ and closed, except as hereinafter pointed out, while the apparatus is formed with a separate and detachable oblong base $i$, hollow on its under side and provided at its edge with a rising packing ledge or flange $i'$, within which and upon the base $i$ rest the backing-plates $d$ and filling or distance pieces $c$. An octagonal top or cap $j$ is employed, which rests upon the upper end of the cylindrical center or core $b$ and is provided with a ring-like projection $j^2$, which fits into the bore thereof and serves to centralize the same, while at its edge the top $j$ is formed with a depending ledge or flange $j'$, similar to that $i'$ which incloses the filling or distance pieces $c$, and backing-plates $d$ and vent-holes $j^3$ are provided in suitable positions opposite the spaces $g^*$. The bushes to be lined or faced are in this case formed with one end flange $a^4$, the face of which, together with that of the main part of the bush, is provided with dovetail key-grooves $a'$; but the backs of the main parts of the bushes $a$ are formed, by way of example, although the pattern may be varied, with several vertically-disposed flats or facets thereon, against two of which the backing-plates $d$ bear and against the others of which the filling or distance pieces $c$ bear. Two filling or distance pieces $c$ are employed, and each of these is formed many-sided and arranged so as to embrace the two bushes, and thus assist to hold them in position, while the filling-pieces and backing-plates are kept in position by set-screws $f'$ $f'^*$, screwing through a rectangular frame $f$. The flanges $a^4$ of the bushes $a$ do not meet at their ends; but the space between them is filled up, or nearly so, by fillets or projections $c^4$ from the filling-pieces $c$, which at their ends approach each other to within a short distance, which is made up by a loose fillet $c^5$, having pouring-ways $c^6$ registering with the holes $h^6$ in the pouring-tube $h$. In this example the pouring-tube $h$ is arranged in the center of the apparatus, and the cover or top $j$ of the apparatus is perforated with a rectangular hole $j^4$, through which the pouring-tube is passed, and the bottom $b^{}$ of the cylindrical center or core $b$ is formed with a conical hole $b^{11}$ therethrough, and the lower part of the pouring-tube $h$ is exteriorly reduced and at $h^5$ coned to fit said hole, and beyond the bottom $b^{}$ of the cylindrical center said tube is provided with perforations $h^6$, through which the molten metal flows first into the space $g^{**}$, where the lining of the flange $a^4$ is cast, and then into the space $g^*$, where the main part of the lining is cast, driving before it the contained air, as hereinbefore described. The end of the reduced part $h^7$ of the pouring-tube is continued between and beyond the adjacent flanges $a^4$ of the bodies $a$ and through a hole $i^2$, formed through the bottom $i$ of the device; but the bore of tube $h$ terminates a short distance below the bushes, forming a kind of depression $h^8$, from which the metal rises and flows out by the ways $h^6$, as above explained, the effect of which device is somewhat similar to that of the depression $e^{12}$ of the pouring-block inasmuch as it equalizes the flow of the metal into the spaces $g^{**}$. Beyond the depression $h^8$ the pouring-tube is formed solid and threaded and exteriorly of the bottom $i$ is provided with a nut $h^9$, which bears against the bottom $i$ and by screwing up which nut the pouring-tube may be drawn into position, so as to make a tight joint between the cone $h^5$ of the tube and coned hole $b^{11}$ of the cylindrical center, while at the same time the lower part of the cylindrical center or core $b$ is centralized and so retained with relation to the rest of the apparatus. The pouring-tube $h$ is in this case divided from the bottom of the depression $h^8$ upward, leaving the part below solid.

It will be evident that if desired the pouring-tube $h$ may in all arrangements be formed undivisible; but this would entail the necessity of melting out the solidified metal, and therefore the divisible tube is preferable.

By the means hereinbefore described one or several bushes may be formed or lined at one operation, and by reason of the method of introducing the metal into the mold at the lower part thereof the casting will be virtually free from blow-holes or similar imperfections, while when using the improved pouring-block it will be more equally distributed in the several compartments of the mold and at the same time more efficiently condensed than heretofore, and consequently the durability of the bushes will be much improved.

Having now particularly described and ascertained the nature of the said invention and in what manner the same is to be performed, I declare that what I claim is—

1. In apparatus for casting or lining or facing bushes for bearings, a mold formed with two or more compartments, a pouring-block adapted to supply the molten metal to said compartments and formed with a central well, inclined ways leading from the well at a suitable level between the top and bottom thereof and passing through the wall of said well, and open inclined gutters or channels arranged in continuation of said ways for leading the molten metal to or near to the compartments of the mold substantially as herein shown and described and for the purpose stated.

2. In apparatus for casting or lining or facing bushes for bearings, a pouring-block for conducting the molten metal to the compartments of the mold and formed with a base having near its periphery or edge vertical holes therethrough of gradually-increasing diameter in an upward direction terminating in enlargements, a central hollow in said base open at the bottom, a projection from the top of said base, a horizontally-divided upper part mounted on the projection of the base, a hollow or recess in said upper part, perforations through the bottom of said hollow and the projection of the base, a bolt passing through said perforations for separably connecting said parts, a downward hollow projection from the upper divided part fitting into the recess or hollow in the lower divided part, a central hollow projection or well on the upper divided part, an interiorly beveled or inclined mouth to the wall of said well, a conical depression below said mouth, a way from the bottom of said conical depression through to the hollow of the upper part, a screwed plug entering said way from the lower end and closing the bottom of said depression, inclined ways leading from the well at a suitable level at about the upper part of the conical depression and passing through the wall of the well, open inclined gutters or channels arranged in continuation of said ways, and vertical tapered ways at the extremities of said gutters, the upper divided part being formed to slightly overlap the lower divided part all substantially as herein shown and described and for the purpose stated.

3. In apparatus for casting or lining or facing bushes for bearings, a mold having two or more compartments provided with vent-holes at the top and pouring-holes at the bottom thereof, vertical pouring-tubes arranged upon the exterior of the mold and at their lower ends communicating with said pouring-holes, a pouring-block for supplying the molten metal to the pouring-tubes and provided with a base formed to rest upon the mold and having near to its periphery or edge vertical holes or ways therethrough adapted to register with the vent-holes of the mold said holes being of gradually-increasing diameter in an upward direction, a projection on the upper part of said base, an upper part to the pouring-block formed with a central well, inclined ways leading from the well at a suitable level between the top and bottom thereof and passing through the wall of the well, and open-ended gutters or channels arranged in continuation of said ways and terminating in vertical tapered ways arranged over the pouring-tubes for leading the molten metal thereinto and thus into the compartments of the mold substantially as herein shown and described and for the purpose stated.

In witness whereof I have set my hand in the presence of two witnesses.

WILLIAM GEORGE HANNA.

Witnesses:
C. MELBOURNE WHITE,
C. H. WHITE.